(12) United States Patent
Kletter

(10) Patent No.: US 6,224,189 B1
(45) Date of Patent: May 1, 2001

(54) ENHANCED TEXT AND LINE-ART QUALITY FOR MULTI-RESOLUTION MARKING DEVICES

(75) Inventor: Doron Kletter, San Mateo, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/383,865

(22) Filed: Aug. 26, 1999

(51) Int. Cl.⁷ ....................................................... B41J 2/21
(52) U.S. Cl. ............................................................... 347/43
(58) Field of Search ................................. 347/43; 358/515

(56) References Cited

U.S. PATENT DOCUMENTS

| | | | |
|---|---|---|---|
| 4,682,216 | * 7/1987 | Sasaki et al. | 347/43 |
| 5,247,352 | * 9/1993 | Nagler et al. | 358/515 |
| 6,014,462 | * 1/2000 | Yamakawa | 382/200 |

* cited by examiner

*Primary Examiner*—Thinh Nguyen
(74) *Attorney, Agent, or Firm*—Robert Cunha

(57) ABSTRACT

A technique for producing high quality output on a mixed-resolution color printing device. Unlike current techniques that impose global ink-limit and dot scheduling constraints, the new method can improve the quality of text and line-art features by rendering the outline at the highest resolution yet maintaining an overall ink-limit by compensating the inside density. The new method uses a programmable unsharp mask filter to detect and outline these edges. The system uses bigger black drops than for the three colors, so the big drops have to be treated differently for avoid saturating the paper. The method allows a little saturation, selectively as necessary, and controls the drop spacing and color correction to minimize the problem for nearby pixels. The result is that the quality of rendering is superior to that of the current rendering methods, especially for text and fine line-art graphics. The technique also limits head heating.

8 Claims, 3 Drawing Sheets

ENHANCED TEXT AND LINE-ART QUALITY FOR MULTI-RESOLUTION MARKING DEVICES

BACKGROUND OF THE INVENTION

A method of generating high quality output on a mixed-resolution printing device using image processing to drive the output at the highest resolution possible. The invention is applicable to the recent generation of xerographic and inkjet marking devices that use mixed-resolution for the various colors. Specifically, the invention is applicable to inkjet printers with integrated multi-resolution printheads and/or multi-path or tandem xerography engines that operate at more than one processing-speed simultaneously.

One particular example for which the method was developed and demonstrated to produce superior results is the case of a color thermal inkjet printer using an integrated printhead with a nominal resolution of 600-dpi for the colors (Cyan, Magenta, and Yellow) and 300-dpi for Black (K). The reason for the mixed-resolution design is to enable high-quality color output (i.e., "photo quality"), yet to reuse the proven 300-dpi black ink technology from the previous generation products.

In said inkjet case, the printhead embodies an integrated design with a number of thermal ejectors, all arranged in a single physical column. In order to facilitate faster printing of monochrome documents, a larger amount (up to about half) of the available ejectors are allocated to the black ink. The black ejectors are etched on a 300-dpi spacing. The remaining ejectors are equally allocated to Cyan, Magenta, and Yellow, and are etched on a 600-dpi spacing.

Since the printhead is fabricated from a single piece of material, the final printing resolution is determined by the timing of the jet firing and the relative movement between the printhead and media. It is obvious that in order to achieve true 600-dpi printing the printhead must be stopped on the 600-dpi grid locations of the media. However, if the black ejectors were allowed to fire simultaneously with the color ejectors on the same grid, then the volume of black ink would be four times larger than that of any single color, and the application of so much ink would flood the page. In addition, the black ejectors would be fired at a rate of four times faster than nominal (300 dpi) operating frequency and this may cause the printhead to overheat and shut down.

A practical method of eliminating the above difficulty, that is—controlling the amount of ink and at the same time preventing the printhead from overheating is to restrict the firing of the black jets to the 300-dpi grid. Typically, this is accomplished via a pre-programmed firing pattern (also known as the mask) that is stored in the printer's non-volatile memory. Usually there are separate mask patterns for each of the color separations. The contents of the mask patterns are bitwise ANDed with the incoming binary print image in order to gate and disable the jets from firing on the non-allowed locations. The mask patterns are convenient for implementation since they also allow the support of checkerboarding patterns often used with the various print modes and multiple number of passes that are common with these inkjet devices.

However, by restricting the black jets to fire on a fixed 300-dpi grid, the effective quality of text and other black features is greatly compromised. Furthermore, additional image processing is usually required in order to take into account the differences in ink-volumes and ensure the proper [neighborhood-wide] under-color removal. Often, the additional cost associated with these operations prohibits their use for the low-end high-volume inkjet devices. Instead, manufacturers often resort to relying on ink-reduction techniques, but these, too, tend to compromise quality by forcing a limit to the total amount of ink or utilizing the under-color removal for that purpose.

The current method of processing data for print heads is documented in FIG. 1 which is an image processing block diagram. All text, line-art, and images are converted and treated as a single bitmap object prior to color correction and rendering. All the pixels comprising the print page are treated the same regardless of their source of origin (be it text, line art, or image). The following is a brief summary of the existing method.

Referring to FIG. 1, the RGB data is first passed through a gamma correction table to compensate for the difference between the device RGB and the RGB primaries used for generating the 3D color correction lookup table. It also takes into account the device non-linearity's and the different surrounding effects between the input and output. Since the device primaries and non-linearity's are impossible to obtain, they were replaced with the gamma correction. The gamma function values were empirically determined from 1.2 for plain paper to 1.8 for HQ glossy paper to 2.0 for transparency. The gamma corrected RGB was then color-space converted to YES, the Y component further compressed by passing through a TRC, and converted back to RGB. The modified RGB values were then used as input to the main 3D color-correction lookup table, where they were converted to CMY. A GCR/UCR (under color removal) function was used to generate the K component, which was then passed through four 1D linearizing TRCs and the final 1D ink-limit TRCs. The ink-limited CMYK data was then used to fire the jets in accordance with a pre-determined dot-scheduling algorithm that was selected to match the desired media type.

With respect to the existing color correction scheme, the UCR/GCR strategy for the print head is to replace the primary color inks (CMY) with black ink (K) at a level that minimizes the graininess. However, since black dots have nearly twice the drop volume and therefore are very visible, the approach taken was to not remove CMY for light colors (i.e., no addition of black ink) in order to eliminate the situation of grainy sparse black dots. For darker colors, on the other hand, the desire was to partially replace CMY with black ink.

The final recommendation for coated paper was to apply two different functions for the subtraction of CMY and the addition of K, both starting from a density level that optimizes the graininess (0.15 to 0.25). While the K addition function continues to grow monotonically, the CMY subtraction function reaches a peak and then falls back to zero. This algorithm has the advantage of no K in the highlights and good maximum solid area density (up to 400% ink), but because it puts down a lot of ink in dark colors it requires aggressive ink limitation TRCs (toner reproduction curve). More over, the algorithm fails to control the inks on plain paper, particularly for media with a severe show-through problem.

A more complicated function consisting of three parts: graininess control, parabolic section, and a linear part, may be used for this case. In addition, the maximum coverage of CMYK inks must be limited based on the amount of show-through, inter-color bleeding, and chrominance levels. Since the spot size of the black ink is twice as large as CMY, it is not sufficient to limit the ink in CMY. It was essential to use multiple passes in some of the driver print modes. For example, the High Quality printing mode at 600×600 dpi uses 4 passes for CMY and 8 passes for K, with 50% color coverage for CMY and 25% for K. Especially dark colors composed of CMYK values would tend to generate more ink than the media are capable of holding. Therefore the ink-limitation method is critical for ensuring optimum color gamut and dynamic range.

A major drawback of the existing method is that the resulting multi-pass dot-scheduling algorithm that was derived based on the above global considerations has made it very non-flexible with respect to the local neighborhood requirements. To illustrate this point, consider an example of a two-pass dot-scheduling algorithm in which only the odd dots are allowed to be exercised in the first pass, and then only the even dots in the second pass. Assume further that the media is limited in the amount of black ink it can take (which is almost always the case at 400% ink). The global ink limitation would preclude the usage of a two-pass algorithm for a fear that too much ink might be allowed to flood the page. Therefore the sole remaining option is to use one of the single-pass options for printing with limited 50% ink coverage. Hence this can be viewed as equivalent to compromising the output resolution (effectively cutting it down by two) and giving up in maximum density in order to maintain the desired global ink-limit.

But what if the object of interest happens to be a small text character or line-art feature of limited size? There is no reason to sacrifice the quality of rendering since there is little fear of ink overflow, for most media can tolerate more ink locally, as long as the total amount of ink in the neighborhood is under control. As will be demonstrated under the proposed method, the quality of such objects can be dramatically improved by rendering the feature outline at the highest resolution while maintaining the overall ink-limit true by compensating the inside body fill density. The new technique could be viewed as a mixture of a single-pass algorithm and occasionally "locally switching" to using the two-pass algorithm for rendering the outline/edge of features with better quality and increased resolution.

SUMMARY OF THE INVENTION

In this invention we propose a new method to alleviate the above problems. The new method eliminates the need for mask patterns and allows the black jets to render the outline of objects such as text and line-art at the highest resolution (600-dpi). At the same time, the method controls the total amount of ink (and thereby the printhead temperature) by eliminating drops that are inside the body/fill of the line-art/character object in order to maintain a fixed number of drops in a local neighborhood.

The new method uses a programmable unsharp mask filter to detect and outline edges in the C, M and Y separations, followed by UCR. The quality of rendering is far superior to that of the current rendering method, especially for text and fine line-art graphics, because the unsharp mask prior to thresholding and error dispersion makes it more likely that black dots will occur just inside the edge, and less likely that they will occur outside. In addition, the edges may exceed the maximum allowable ink coverage, but because it is for a thin line along the image edge, flooding will not occur. The end result is black dots having a 300 dot per inch diameter printed on 600 dot per inch centers to form a better edge.

The new method is effective and simple to implement, requiring only the addition of an unmask-sharp filter. Such filter is often used as part of the image path for the purpose of edge enhancement and image sharpening prior to error-diffusion. Therefore the additional cost is minimal.

DETAILED DESCRIPTION OF THE INVENTION

Figure 1:
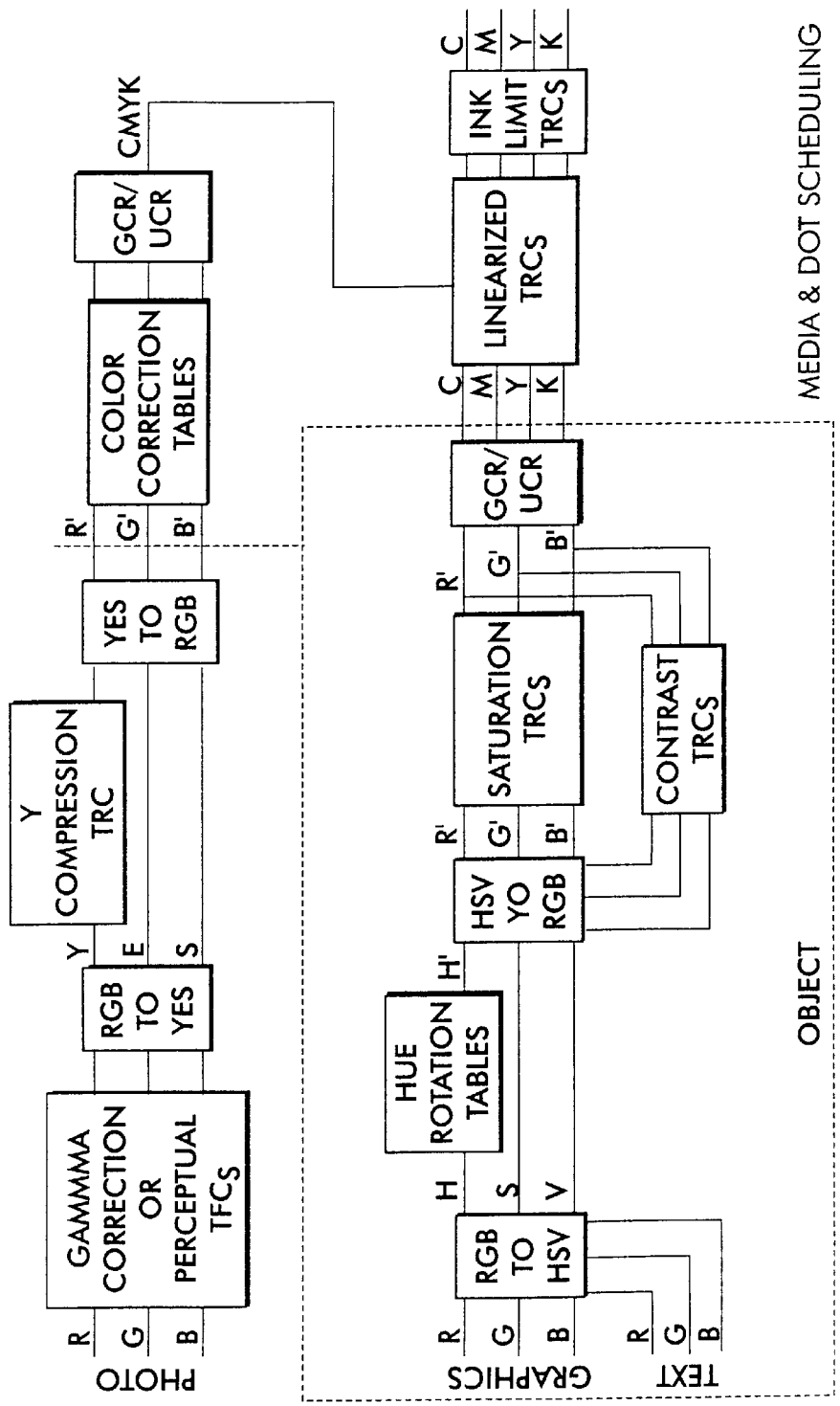
FIG. 1 is a block diagram of a typical prior art system.

The head intended to be used in this invention is designed such that the black nozzles are etched wider than the color nozzles in order to drive a larger ink volume to cover the larger 300-dpi dot-area. However, since all the jets are physically integrated into a single head, the whole head must be addressable on a 600-dpi grid to access all of the printing locations for the high-quality color mode. Note that there is no hardware restriction on which nozzles to fire at any given location; It is the responsibility of image path to not fire all of the 300-dpi nozzles, for otherwise these dots will largely overlap and cause four times as much ink to flood the paper. Not only would the ink inter-bleed into the neighboring location and mix with the other colors, but also the paper (particularly if plain) would not be able to hold so much ink and it would curl and cockle. In addition, the black jets and ink delivery system are not designed for 600-dpi addressability printing, and the high rate of firing can cause of air bubbles to form (clogging) and overheat the whole head.

However, even when the black jets are properly fired at the 300-dpi rate, there are additional complications to consider. First, the color dots of the current and close-proximity pixels tend to interact with the increased amount of black ink. This introduces local color shifts that are not well modeled by the pixel-independent printer color correction LUT (lookup table). In addition, the black ink does not interact well with the colored ink, so even a moderate amount of black can totally overwhelm the output. The current approach for limiting the amount of ink is to use the printer color correction table in combination with a special GCR/UCR algorithm, ink-limiting TRCs, and multi-pass dot-scheduling algorithm.

The alternative we propose in this disclosure is to replace the above technique with a new approach that is no longer attempting to enforce the global ink-limit constraints to each and every pixel. Rather, the new approach is seeking to maintain an overall ink-limit budget across some local neighborhood, and at the same time favoring edge detail along edges. The new method uses a programmable unsharp mask filter to detect and emphasis these edges. The unsharp mask filter is applied prior to color conversion to CMYK. It can be applied to the modified RGB data, but is best if done in a more perceptual space such as LAB, YES, or YCC.

In comparison with the prior art alternatives, the fact that the text has been "outlined" prior to rendering contributes significantly to the perceived improvement in text quality. The "outlining" operation, depending on the selected "unmask sharp" value, is likely to turn most of the dots at or near the outline on, thus leading to a smooth and uniform character stems. In the inside of a character, however, the dots are back to 50% density, thereby preventing the situation of too much ink leading to bleed and paper cockle. And, more significantly, since the "outline" operation tends to track the character shape, the outline dots tend to follow this shape at the highest printer resolution (600 dpi for the 450 cp) while the inside gray is filled with 300 dpi dots. The end result is that the text resolution is effectively "doubled" by the enhanced method, even though most of the text body is rendered at lower resolution (300 dpi for the 450 cp).

The quality of the text can be controlled via the amount of "unsharp mask" outlining. As the "unsharp mask" is increased, more dots on the outline are likely to turn on, thereby filling in the outline and reducing the text/line-art ruggedness. However, if too much outlining occurs, thin features such as serifs may turn too dark relative to the inside of the font, making it appear less uniform. Furthermore, additional outlining may eventually cause too many pixels near the text boundaries to turn black, thereby flooding the area with ink. Hence the amount of "unsharp mask" value should not be over exercised, as this would end up reducing the quality. Our experience has seems to indicate that the algorithm is not too sensitive to the exact values, and the chosen set of "unsharp mask" parameters of (radius=0.85 pixels, magnitude=150%, threshold=0) seems to work well with most 6-point or higher fonts.

Figure 2:
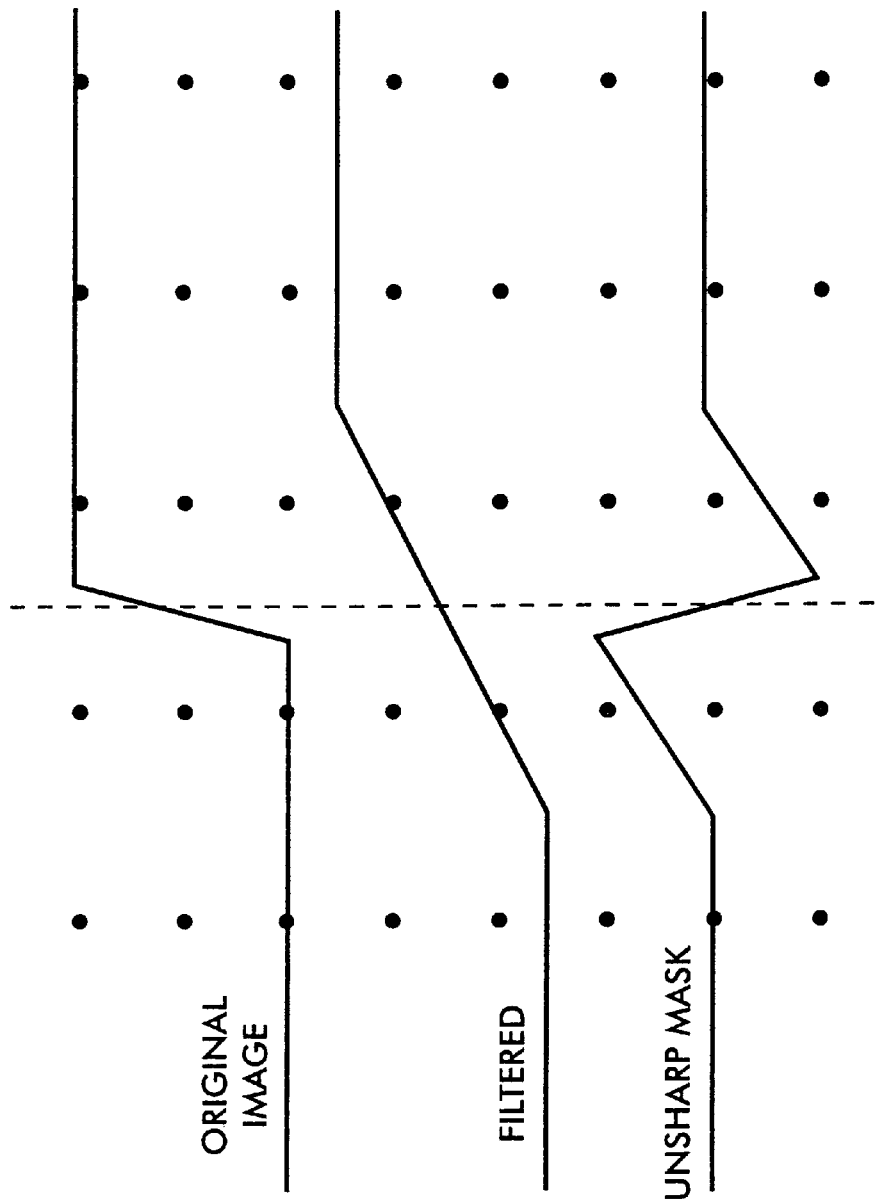
FIG. 2 is a set of unsharp filter waveshapes.

This invention uses an unsharp mask as shown in FIG. 2. Any method can be used to generate this waveshape, one of which is to add the original image to a low pass filtered version, as shown. The effect of adding the mask to the image, along with thresholding and error dispersion, is to move any dot that is on or near the edge a small distance into the dark portion of the image.

Figure 3:
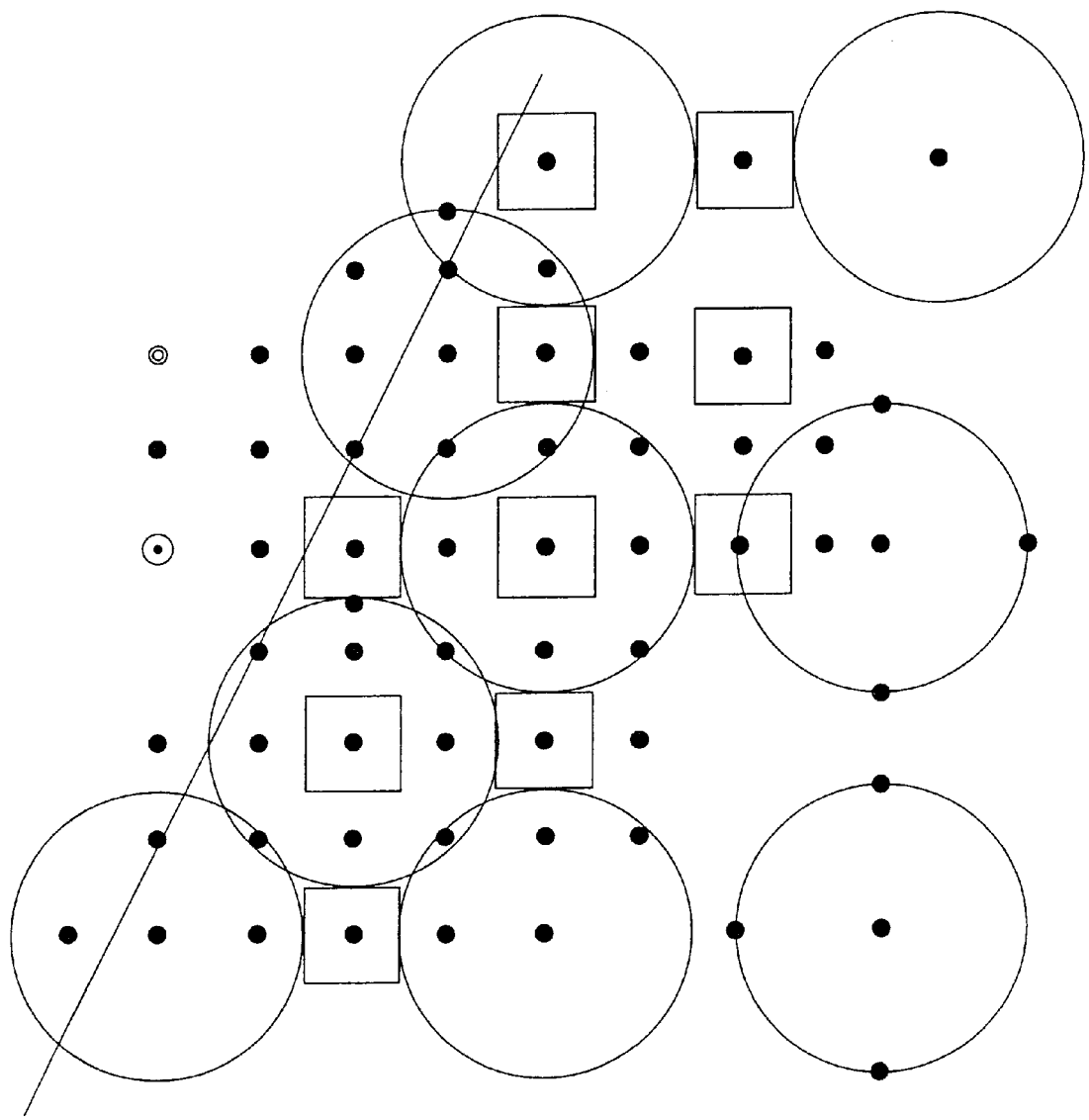
FIG. 3 is a diagram showing the edge enhancement resulting from this process.

The effect is shown in FIG. 3. The smaller color dots are shown as squares while the larger black dots are shown as circles, both arranged on 600 dot per inch centers, and the image edge is shown going left to right from light to dark. Within the area of constant color to the right of the image the black dots are shown as arranged at a constant density of, let us assume, 300 dots per inch which represents the maximum amount of ink that can be applied to the paper. However, at the left edge, because of the unsharp masking, thresholding and error dispersion, the black dots are crowded together just to the right of the edge. One result is that the edge is less jagged than it would be otherwise, improving the outlines of text characters. The other result is that the maximum ink coverage limit is exceeded, but that is tolerable for small areas such as the thin line of dots along the image edge, which is the only place where the unsharp masking will have any effect. The result is improved image quality.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method for use in an ink jet system for printing a color image from input pixels having digital values using a color printer adapted to form dots of one color separation that are a different size or resolution than the other color dots, the method comprising the steps of:

producing an unsharp waveshape of pixels from the input pixels of the one color, adding or subtracting the unsharp waveshape pixels and the input pixels of the one color only to form a filtered image, and printing the image.

2. The system of claim 1 wherein the unsharp waveshape of pixels results from passing the one color image of pixels through a low pass filter to form a low pass image of pixels and adding or subtracting the low pass image pixels and the input pixels.

3. The system of claim 1 wherein the other pixels of the color image are limited to a maximum density, but wherein the pixels of the one color are not limited to the same maximum density.

4. A method for use in an ink jet system for printing a color image from input pixels having digital values using a color printer adapted to process one color at a different process speed from the other colors, the method comprising the steps of:

producing an unsharp waveshape of pixels from the input pixels of the one color, adding or subtracting the unsharp waveshape pixels and the input pixels of the one color only to form a filtered image, and printing the image.

5. The system of claim 4 wherein the system is a tandem or multipass xerographic system.

6. The system of claim 4 wherein the unsharp waveshape results from passing the color image through a low pass filter to form a low pass image and adding the low pass image and the unsharp waveshape.

7. The system of claim 4 wherein the color image is limited to a maximum density, but wherein the black dots are not limited to the same maximum density.

8. The system of claim 4 further comprising a color conversion step after the adding step.

\* \* \* \* \*